O. D. HUTTO.
SELF PITCHER.
APPLICATION FILED SEPT. 27, 1910.

1,034,366.

Patented July 30, 1912.

3 SHEETS—SHEET 1.

WITNESSES:
J. A. Brophy
P. L. Rollhaus

INVENTOR
Orlando D. Hutto
BY Munn & Co.
ATTORNEYS

O. D. HUTTO.
SELF PITCHER.
APPLICATION FILED SEPT. 27, 1910.

1,034,366.

Patented July 30, 1912.

3 SHEETS—SHEET 3.

WITNESSES:

INVENTOR
Orlando D. Hutto
BY
ATTORNEYS

UNITED STATES PATENT OFFICE.

ORLANDO D. HUTTO, OF RUSSELL SPRINGS, KANSAS.

SELF-PITCHER.

1,034,366.     Specification of Letters Patent.     Patented July 30, 1912.

Application filed September 27, 1910. Serial No. 584,021.

*To all whom it may concern:*

Be it known that I, ORLANDO D. HUTTO, a citizen of the United States, and resident of Russell Springs, in the county of Logan and State of Kansas, have invented a new and Improved Self-Pitcher, of which the following is a full, clear, and exact description.

My invention relates to an agricultural machine for taking or gathering grain from stacks and conveying it to a threshing machine or the like.

The object of my invention is to provide a simple machine of this character, requiring but little attention for its adjustment and operation.

The invention will be fully described hereinafter, and its novel features pointed out in the appended claims.

Reference is to be had to the accompanying drawings forming a part of this specification in which like characters of reference denote corresponding parts in all the views, and in which—

Figure 1:
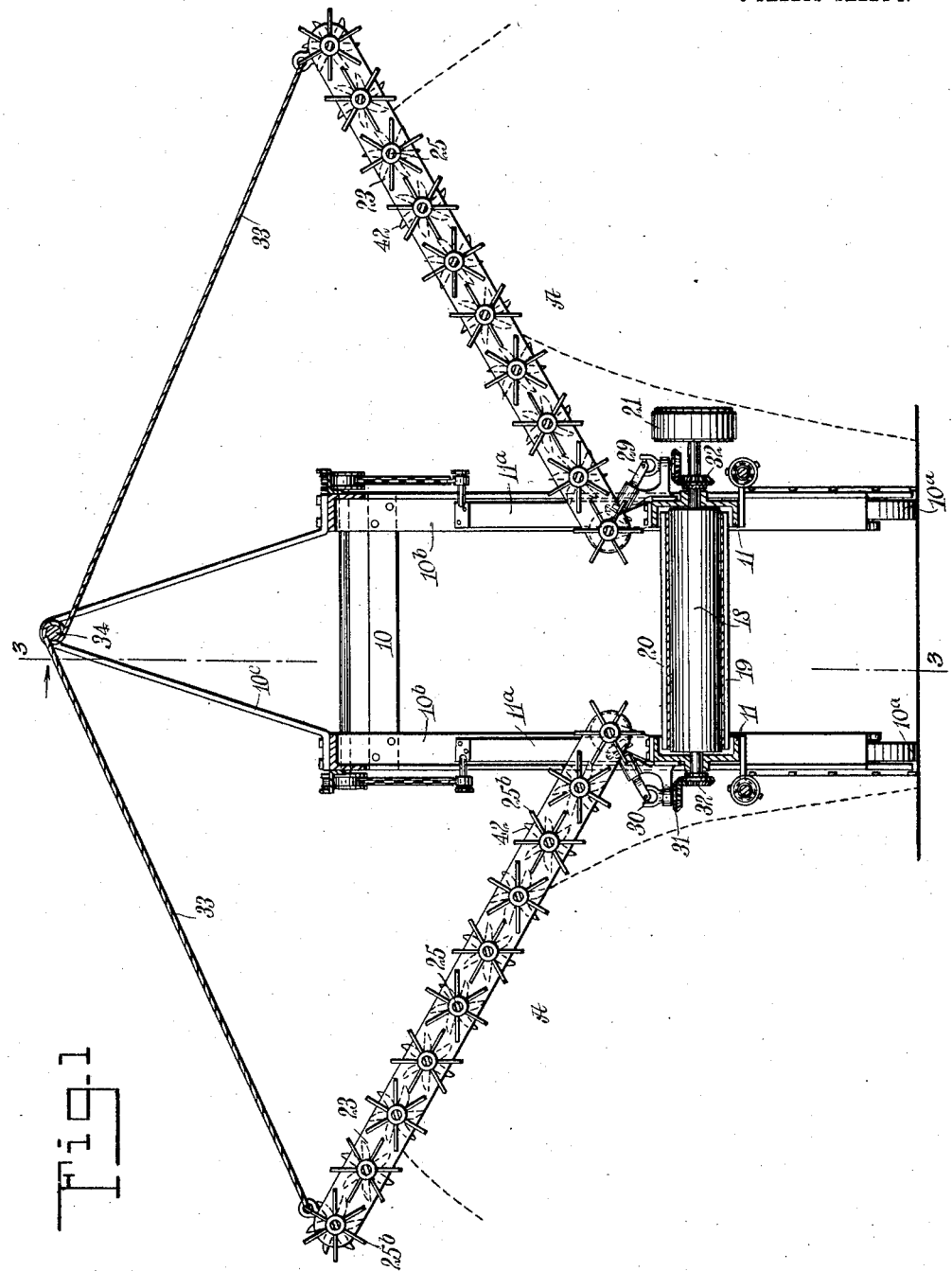
Figure 2:
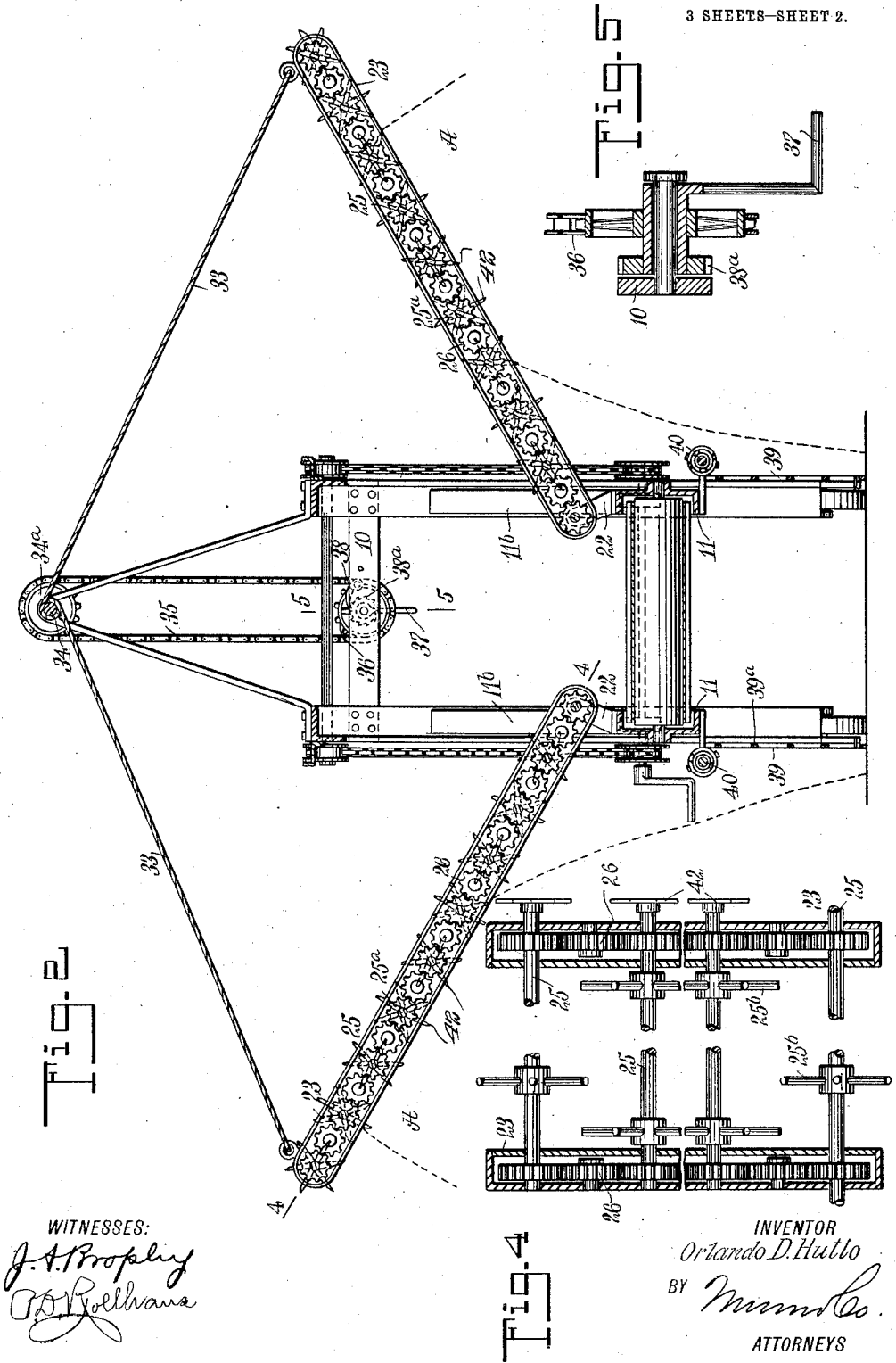
Figure 3:
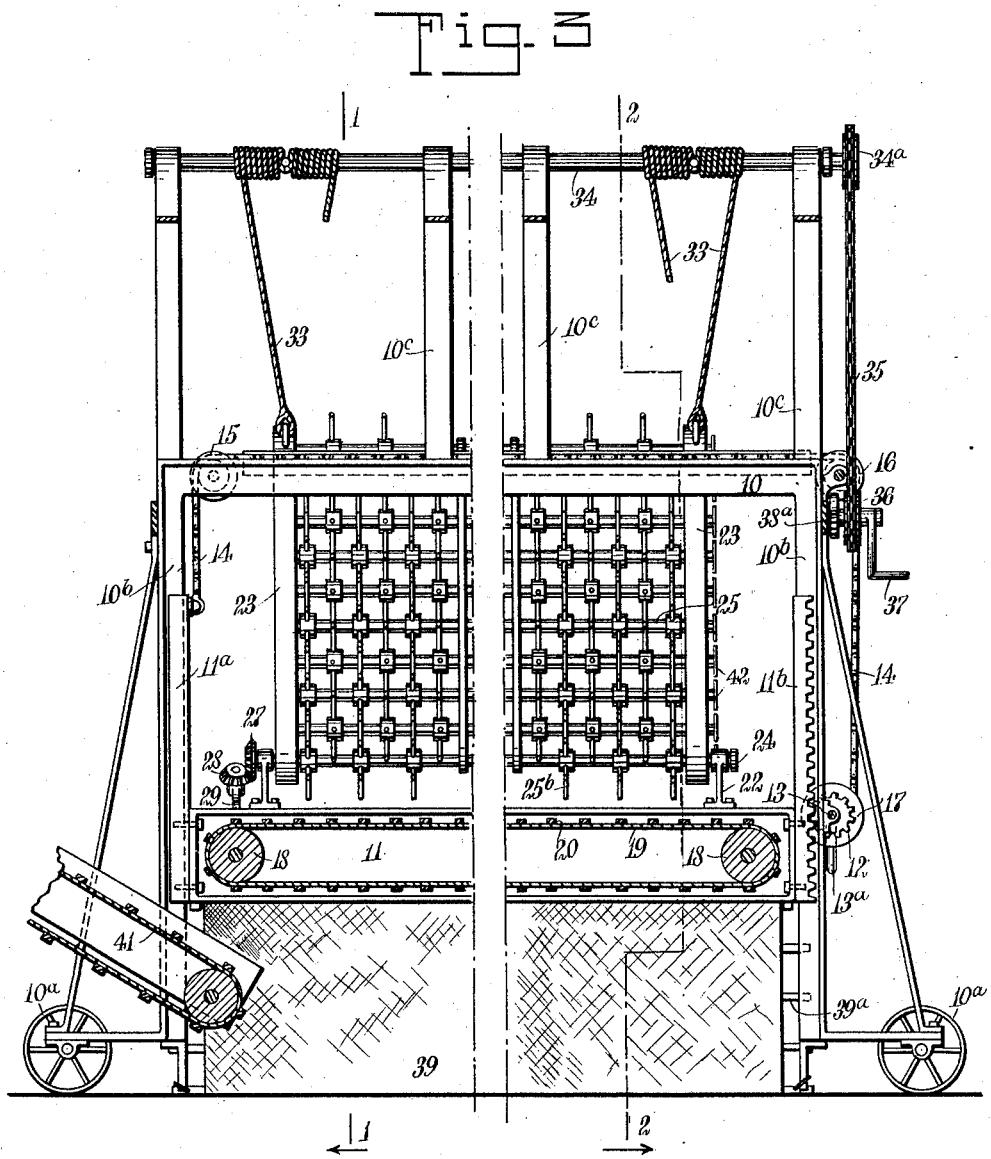

Figures 1 and 2 are longitudinal sections of the improved machine, on the lines 1—1 and 2—2 respectively, of Fig. 3; Fig. 3 is a cross section on the line 3—3 of Fig. 1, with parts broken out; Fig. 4 is a section of certain gearing, substantially on the line 4—4 of Fig. 2; and Fig. 5 is a vertical section on the line 5—5 of Fig. 2.

The frame 10 is carried on ground wheels 10$^a$ and is provided with vertical guideways 10$^b$ on which are adapted to travel slides 11 which may be raised or lowered by any suitable mechanism. For instance, each slide may be provided with an upright 11$^a$ at one end and with a vertical rack 11$^b$ at the other end, the racks being engaged by pinions 12 fast upon a shaft 13 journaled transversely in the frame 10. To the upper end of each upright 11$^a$ is secured a chain or other flexible connection 14 which passes upward to a guide pulley 15, then lengthwise to another guide pulley 16 and finally downward to wind on a pulley 17 secured to the shaft 13. The latter may be turned by means of a crank 13$^a$.

The mechanism described above will insure an even upward or downward movement of the slides 10, without any binding.

The side members of the slides 11 are preferably constructed as channel bars, and in them are journaled transverse rollers 18 carrying a conveyer adapted to travel lengthwise of the machine. This conveyer may comprise an apron 19 made of canvas or other suitable material, and transverse slats 20 made of wood or metal. The traveling of the conveyer is brought about by the rotating of the rollers 18, as by means of a suitable belt pulley 21. The engine (not shown) may be mounted on the same machine, which may be also motor-propelled, if desired. The conveyer edges project into the side members of the slides 11, as shown in Figs. 1 and 2, so that the lower portions of said members will support the lower run of the conveyer when it sags.

On the side members of the slides 11 are secured brackets 22 on which outwardly extending arms 23 are mounted to swing about axes 24 ranging lengthwise of the machine. The two arms on the same side of the machine are connected by longitudinal shafts 25 carrying pinions 25$^a$ in mesh with intermediate pinions 26 journaled on the said arms, so that all the shafts 25 on the same arms will rotate in the same direction. The arms are preferably hollow (see Fig. 4) to better protect the gearing. On the exposed central portions, the shafts 25 are provided with projecting spokes or pins 25$^b$, the pins of adjacent shafts being arranged in staggered relation, as shown in Figs. 3 and 4. The lowermost shaft of each series forms a pivot or hinge for the arms 23 mounted loosely on said shaft, and carries a bevel wheel 27 in mesh with a pinion 28 on an inclined shaft 29 journaled in a bracket 11$^c$ of the slides 11. Each inclined shaft 29 is connected by a universal coupling 30 with a vertical shaft 31, the two vertical shafts being driven from the shaft of one of the rollers 18, by means of bevel gearing 32.

The arms 23 may be swung about their pivots or hinges 24 by means of ropes or other flexible connections 33, the lower ends of which are secured to the outer ends of the arms, while their inner portions are wound about a longitudinal shaft 34 journaled in brackets 10$^c$. This shaft carries a sprocket wheel 34$^a$, which by means of a chain 35 is driven from another sprocket wheel 36, which may be rotated by means of a crank 37. A pawl 38 engaging a ratchet wheel 38$^a$, normally prevents the sprocket wheel 36 from turning in one direction, and thus keeps the arms 23 in their adjusted position.

The sides of the machine, between the slide 11 and the ground, are covered by aprons or strips 39, of canvas or other suitable material, provided with slats 39ª and winding on longitudinal rollers 40 carried by the slides 11 and rotatable by any suitable means (not shown).

An elevator 41 of well-known character is shown in Fig. 5, as a means for receiving and carrying away the grain delivered by the conveyer 19, 20.

In operation the machine is brought adjacent to stacks, preferably of loose grain, as indicated at A in Fig. 1, which shows that two stacks can be worked on at the same time. The slides 11 are adjusted till the conveyer is at about half the height of the stacks, and the arms 23 are lowered until the pins 25ª on a plurality of shafts 25 engage the top of the stacks. The conveyer 19 and shafts 25 are then set in motion, said shafts turning in such a direction as to feed the grain inward under the arms 23, toward the side strips 39. The latter prevent the grain from being crowded under the machine, and should preferably be so adjusted as to almost or just touch the ground. The grain is forced by the fingers or pins 25ª on to the upper run of the conveyer 19, which then carries the grain to the elevator 41. As the operation progresses, the slides 11 and arms 23 are lowered from time to time, and the strips 39 may be taken in correspondingly at the same time, if desired.

In some cases a stack may be too long to be handled by the machine. To meet the requirements of such cases, I have mounted suitable rotary cutters 42 upon those ends of the shafts 25 which are farthest away from the discharge end, that is, from the elevator 41. These cutters are preferably star-shaped, as shown in Fig. 2, with a cutting edge on one edge only of each tooth. The cutters are located exteriorly of the adjacent arms 23. If the stack is too long, the machine will be so placed that the cutters 42 will register with the center of the stack, and as the arms 23 are lowered, the cutters will divide the stack into two sections, one of them being gathered first, and then the machine is moved to a new position to gather the remaining section of the stack.

Various modifications may be made without departing from the nature of my invention, as defined in the appended claims.

Having thus described my invention, what I claim as new and desire to secure by Letters Patent is:—

1. In a gathering machine, a vertically adjustable longitudinal conveyer, an overhanging transverse conveyer, likewise adjustable vertically, the lower face of said transverse conveyer being arranged to feed the material to the upper face of the longitudinal conveyer, and a traveling frame on which both of said conveyers are mounted.

2. The combination of the frame, the slide movable thereon vertically, the longitudinal conveyer on the slide, and the transverse conveyer the inner end of which has its lower portion above the upper portion of the longitudinal conveyer.

3. The combination of the frame, the slide adjustable thereon up and down, the longitudinal conveyer on the slide, and the transverse conveyer whose inner end is pivoted to the slide above the top of the longitudinal conveyer.

4. The combination of the frame, the slide adjustable thereon up and down, the longitudinal conveyer on the slide, the transverse conveyer whose lower surface is operative to carry the material toward the longitudinal conveyer, and an apron depending lengthwise of the machine adjacent to said longitudinal conveyer.

5. The combination of the vertically adjustable longitudinal conveyer, the transverse conveyer whose lower surface is operative to carry the material toward the longitudinal conveyer, and a vertically adjustable, extensible apron depending lengthwise of the machine adjacent to said longitudinal conveyer.

6. The combination of the frame, the slide adjustable thereon up and down and having inwardly open channeled side members, a longitudinal conveyer whose edges are located within said channeled members, and means for delivering the material to said conveyer.

7. The combination of the longitudinal conveyer, the pivoted transverse arm, means for swinging it on its pivot, shafts parallel with said pivot, journaled on said arm and provided with conveying fingers, toothed wheels on said shafts, intermediate gears journaled on said arm and meshing with two adjacent wheels, and a traveling frame on which said conveyer and arm are mounted.

8. The combination of the frame, the slide adjustable thereon up and down, the transverse arm pivoted to the slide, the longitudinal conveyer on the slide, the transverse conveyer on said arm, and independent mechanisms for governing the vertical position of the slide and of the arm respectively.

9. The combination of the frame, the slide adjustable thereon up and down, the longitudinal conveyer on the slide, the transverse conveyer connected with the slide and having a lower surface operative to carry the material toward the longitudinal conveyer, an apron depending adjacent to the longitudinal conveyer, and a roller on which winds the upper end of said apron.

10. The combination of transverse rollers, a longitudinal conveyer carried thereby, a vertical shaft geared to the shaft of one of the rollers, an overhanging arm, a transverse conveyer on said arm, and an inclined shaft operatively connected with the transverse conveyer at one end and with the vertical shaft at the other end.

11. In a gathering machine, a vertically movable arm adapted to be lowered upon the material to be gathered, a conveying mechanism carried by said arm and having its lower portion operative to carry the material away, and cutting mechanism carried by said arm to divide a stack into two sections.

12. In a gathering machine, a vertically movable arm adapted to be lowered upon the material to be gathered, a series of shafts carried by said arms and provided with conveying fingers and also with rotary cutters, and means for rotating said shafts.

In testimony whereof I have signed my name to this specification in the presence of two subscribing witnesses.

ORLANDO D. HUTTO.

Witnesses:
W. L. TALLMAN,
J. E. MENEN.

Copies of this patent may be obtained for five cents each, by addressing the "Commissioner of Patents, Washington, D. C."